(12) United States Patent
Namba et al.

(10) Patent No.: US 7,740,532 B2
(45) Date of Patent: Jun. 22, 2010

(54) RECORDING MEDIUM STORING GAME PROGRESS CONTROL PROGRAM, GAME PROGRESS CONTROL PROGRAM, GAME PROGRESS CONTROL METHOD AND GAME DEVICE EACH DEFINING A KEY SET HAVING CORRESPONDENCE TO GAME DISPLAY AREAS EACH HAVING PLURAL SECTIONS

(75) Inventors: Kazuhiro Namba, Amagasaki (JP); Masatoshi Yamaoka, Sakai (JP); Katsuhiro Goto, Neyagawa (JP); Hirotomo Yotsugi, Osaka (JP); Norio Nakayama, Osaka (JP)

(73) Assignee: Konami Computer Entertainment Osaka, Inc., Osaka (JP)

( * ) Notice: Subject to any disclaimer, the term of this patent is extended or adjusted under 35 U.S.C. 154(b) by 937 days.

(21) Appl. No.: 10/201,426

(22) Filed: Jul. 23, 2002

(65) Prior Publication Data

US 2003/0022707 A1    Jan. 30, 2003

(30) Foreign Application Priority Data

Jul. 30, 2001  (JP)  ............................. 2001-230294

(51) Int. Cl.
*A63F 9/24* (2006.01)
*A63F 13/00* (2006.01)
(52) U.S. Cl. ..................... 463/4; 463/1; 463/2; 463/36; 463/37; 463/3
(58) Field of Classification Search ................. 463/1–4, 463/7, 36–37, 46
See application file for complete search history.

(56) References Cited

U.S. PATENT DOCUMENTS

| | | | | |
|---|---|---|---|---|
| 3,655,189 | A | * | 4/1972 | Alexander, Jr. ............... 463/51 |
| 3,790,170 | A | * | 2/1974 | Alexander, Jr. ............... 463/52 |
| 3,860,239 | A | * | 1/1975 | Feuer et al. .................... 463/3 |

(Continued)

FOREIGN PATENT DOCUMENTS

EP            0 686 944        12/1995

(Continued)

OTHER PUBLICATIONS

Yakuwa, Tomohiko, Video Type Baseball Game Device, Nov. 2000, [retreived on Jan. 24, 2006]. Retrieved from the Internet: <URL:http://www4.ipdl.ncipi.go.jp/cgi-bin/tran_web_cgi_ejje11-2000, 2 pages.*

(Continued)

*Primary Examiner*—Dmitry Suhol
*Assistant Examiner*—Steven J. Hylinski
(74) *Attorney, Agent, or Firm*—Jordan and Hamburg LLP

(57) ABSTRACT

A key reception processing unit 203 receives a key-designated area designated by means of a tenkey 211, a timing detector 205 detects a timing at which the key-designated area was received, a meet section detector 204 detects a meet section where the center position of a ball object 402 displayed to move on a display screen of a monitor 22 passes, and a game progress processing unit 206 proceeds a game in accordance with a batting result obtained by combining a batting result corresponded beforehand to the detected timing and a batting result corresponded beforehand to the detected meet section.

25 Claims, 6 Drawing Sheets

U.S. PATENT DOCUMENTS

| | | | |
|---|---|---|---|
| 3,950,634 A * | 4/1976 | Speiser | 235/145 R |
| 4,195,838 A * | 4/1980 | Santandrea et al. | 463/3 |
| 4,240,632 A * | 12/1980 | Watanabe | 463/52 |
| 4,240,633 A * | 12/1980 | Watanabe | 463/52 |
| 4,240,638 A * | 12/1980 | Morrison et al. | 463/15 |
| 4,324,402 A * | 4/1982 | Klose | 463/3 |
| 4,326,715 A * | 4/1982 | Ito et al. | 463/31 |
| 4,372,557 A * | 2/1983 | Del Principe et al. | 463/3 |
| 4,381,864 A * | 5/1983 | Bromley et al. | 463/3 |
| 4,395,760 A * | 7/1983 | Soski et al. | 463/3 |
| 4,410,181 A * | 10/1983 | Lapp et al. | 273/238 |
| 4,575,591 A * | 3/1986 | Lugaresi | 200/6 A |
| 4,582,323 A * | 4/1986 | Minkoff et al. | 463/4 |
| 4,716,529 A * | 12/1987 | Nakayama | 463/14 |
| 4,786,768 A * | 11/1988 | Langewis et al. | 200/6 A |
| 4,825,019 A * | 4/1989 | Fisher | 200/6 A |
| 4,945,357 A * | 7/1990 | Tal | 341/20 |
| 5,026,058 A * | 6/1991 | Bromley | 463/3 |
| 5,034,574 A * | 7/1991 | Martovitz | 200/6 A |
| 5,067,079 A * | 11/1991 | Smith et al. | 463/3 |
| 5,194,008 A * | 3/1993 | Mohan et al. | 434/22 |
| 5,417,425 A * | 5/1995 | Blumberg et al. | 273/153 R |
| 5,435,554 A | 7/1995 | Lipson | |
| 5,573,245 A * | 11/1996 | Weiner et al. | 273/153 R |
| 5,601,487 A | 2/1997 | Oshima et al. | |
| 5,603,500 A * | 2/1997 | Olti et al. | 273/153 R |
| 5,640,179 A * | 6/1997 | Lake | 345/161 |
| 5,769,713 A | 6/1998 | Katayama | |
| 5,883,690 A * | 3/1999 | Meyers et al. | 345/161 |
| 6,045,446 A * | 4/2000 | Ohshima | 463/2 |
| 6,120,374 A * | 9/2000 | Akada et al. | 463/3 |
| 6,155,924 A | 12/2000 | Nakagawa et al. | |
| 6,183,363 B1 | 2/2001 | Ishihara et al. | |
| 6,210,273 B1 * | 4/2001 | Matsuno | 463/8 |
| 6,244,956 B1 | 6/2001 | Nakayama et al. | |
| 6,257,983 B1 * | 7/2001 | Rimoto | 463/38 |
| 6,270,413 B1 * | 8/2001 | Aikawa et al. | 463/31 |
| 6,288,708 B1 * | 9/2001 | Stringer | 345/169 |
| 6,292,706 B1 | 9/2001 | Birch et al. | |
| 6,334,813 B1 | 1/2002 | Rimoto et al. | |
| 6,340,332 B1 | 1/2002 | Rimoto et al. | |
| 6,368,210 B1 | 4/2002 | Toyohara et al. | |
| 6,394,894 B1 * | 5/2002 | Okitsu et al. | 463/3 |
| 6,398,647 B1 | 6/2002 | Hirai et al. | |
| 6,450,888 B1 * | 9/2002 | Takase et al. | 463/43 |
| 6,482,090 B1 * | 11/2002 | Rimoto et al. | 463/31 |
| 6,494,783 B2 * | 12/2002 | Namba et al. | 463/3 |
| 6,527,637 B2 | 3/2003 | Fujioka et al. | |
| 2001/0005689 A1 | 6/2001 | Fujioka et al. | |
| 2001/0006908 A1 | 7/2001 | Fujioka et al. | |
| 2001/0008846 A1 | 7/2001 | Yamauchi et al. | 463/31 |
| 2001/0027130 A1 * | 10/2001 | Namba et al. | 463/42 |
| 2001/0029202 A1 * | 10/2001 | Kondo et al. | 463/31 |
| 2002/0103016 A1 | 8/2002 | Namba et al. | |
| 2002/0107058 A1 | 8/2002 | Namba et al. | |
| 2003/0003977 A1 * | 1/2003 | Takahashi et al. | 463/3 |
| 2003/0017863 A1 | 1/2003 | Takahashi et al. | |
| 2003/0022707 A1 | 1/2003 | Namba et al. | |

FOREIGN PATENT DOCUMENTS

| | | |
|---|---|---|
| EP | 1 060 769 | 12/2000 |
| EP | 1 113 639 | 7/2001 |
| JP | 7-21007 | 1/1995 |
| JP | 10-52572 | 2/1998 |
| JP | 2000-167252 | 6/2000 |
| JP | 2000-317140 | 11/2000 |
| JP | 2000-325654 | 11/2000 |
| JP | 2001-198351 | 7/2001 |
| KR | 2001-0049915 | 6/2001 |

OTHER PUBLICATIONS

"Konami decided to deliver "Powerful Professional Baseball Game, JAVA version"" [online], Jan. 25, 2001, Konami Kabushiki Kaisha, [Search date: Dec. 4, 2003] via Internet, < URL:http://www.konami.co.jp/press/2001/01/006/r.13.01.25.html >.

Konami Magazine, the 20th volume, p. 83, published by Konami Marketing Kabushiki Kaisha on Mar. 2001.

Mar. 25, 2000 "Triple Play, 2001 Cheats" [online]. Mar. 25, 2000, retrieved on Jun. 7, 2005]. Retrieved from the Internet: < URL: http://www.cheats.gamespy.com/pc-cheats/triple-play-2001 >.

Mar. 31, 1999 FKrueger "Triple Play 2000" Game Over Online Magazine. [online]. Mar. 31, 1999, retrieved on Jun. 1, 2005]. Retrieved from the Internet: < URL: http://www.game-over.net/reviews.php?id=130&page=reviews >. FKrueger.

"Triple Play Baseball" Manual. 2000. EA Sports, Redwood City, CA.

"Triple Play 2001" Manual. EA Sports, Redwood City, CA.

Mar. 8, 1999 "Triple Play 2000" PC Games: Triple Play 200 by Electronic Arts. [online]. Mar. 8, 1999, [retrieved on Nov. 18, 2004]. Retrieved from the Internet: < URL: http:pc.ign.com/articles/131/131249pl.html?whreFrom=login >.

The real situation of a powerful professional baseball game, Basic version 2001, a perfect guidance, p. 12, published on Jun. 27, 2001 by Konami Corporation (with partial English translation).

* cited by examiner

RECORDING MEDIUM STORING GAME PROGRESS CONTROL PROGRAM, GAME PROGRESS CONTROL PROGRAM, GAME PROGRESS CONTROL METHOD AND GAME DEVICE EACH DEFINING A KEY SET HAVING CORRESPONDENCE TO GAME DISPLAY AREAS EACH HAVING PLURAL SECTIONS

The present invention relates to a recording medium which stores a game progress control program, a game progress control program, and a game progress control method for controlling the progress of a game played using a game device provided with a display portion and an operable portion, and such a game device.

BACKGROUND OF THE INVENTION (1) Field of the Invention

A special operable portion (controller) has been conventionally used to play a game using a video game device. Thus, it is possible to make complicated inputs. For example, in the case of playing a baseball game, a player (game player) can let a self character (batter character) make complicated motions at the time of an offense (at the time of batting) by operating a cross-key, a joystick or the like provided in the controller, so that a position to meet or hit a ball thrown from an opponent character (pitcher character) can be finely designated.

(2) Description of the Related Art

In recent years, games played using mobile phones as game devices have been spread as the mobile phones have become more functional and the number of users has increased. Games played using the mobile phones and the like include those proceeded, for example, by means of the transmission and the reception of game data to and from a server, those proceeded without any further data transmission and reception to and from the server once receiving a delivery of a game program from the server and downloading the game program in a storage in the mobile phone, and those proceeded by reading a game program stored beforehand in the storage of the mobile phone.

However, since keys usable in the games played using the mobile phone or the like are limited to so-called a tenkey provided in an operable portion of the mobile phone, it has been difficult to make complicated inputs. For example, in the case of playing a baseball game using the mobile phone, it has been difficult to finely designate a ball-hitting position. Some mobile phones are provided with keys capable of designating directions. However, these keys cannot be finely operated to quickly cope with a game situation. Thus, batting results become monotonous, making the game less interesting to game players.

SUMMARY OF THE INVENTION

In view of the problems residing in the prior art, an object of the present invention is to provide a game progress control program, a game progress control method and a game device with which various game progress results can be obtained by simple operations and an interesting and enjoyable game can be offered even if the game device has a simply constructed operable portion like a mobile phone. In order to achieve the above object, according to the present invention, a recording medium storing a game progress control program for controlling the progress of a game played using a game device provided with a display portion and an operable portion, the program causing the game device to function as: designated area receiving means for receiving one designated area selected by a user by means of the operable portion from a plurality of designated areas set on a display screen of the display portion, section detecting means for detecting a section where a movable object displayed to move on the display screen of the display portion passes from a plurality of sections forming the designated area whose designation was received by the designated area receiving means, and game progress processing means for proceeding the game in accordance with a state of the game progress corresponded beforehand to the section detected by the section detecting means.

With this game progress processing program, the designation of one designated area selected by user using the operable portion of the game device from a plurality of designated areas set on the display screen of the display portion of the game device is received, the section where the movable object displayed to move on the display screen of the display portion passes is detected from a plurality of sections forming the designated area whose designation was received, and the game is proceeded in accordance with the state of the game progress corresponded beforehand to the detected section.

Since each of a plurality of designated areas is divided into a plurality of sections and the respective sections are corresponded to the states of the game progress, the game can progress in a variety of ways in accordance with the section where the movable object displayed to move on the display surface of the display portion passes.

These and other objects, features, and advantages of the present invention will become more apparent upon reading the following detailed description along with the accompanying drawings.

DETAILED DESCRIPTION OF THE PREFERRED EMBODIMENTS OF THE PRESENT INVENTION

Figure 1:
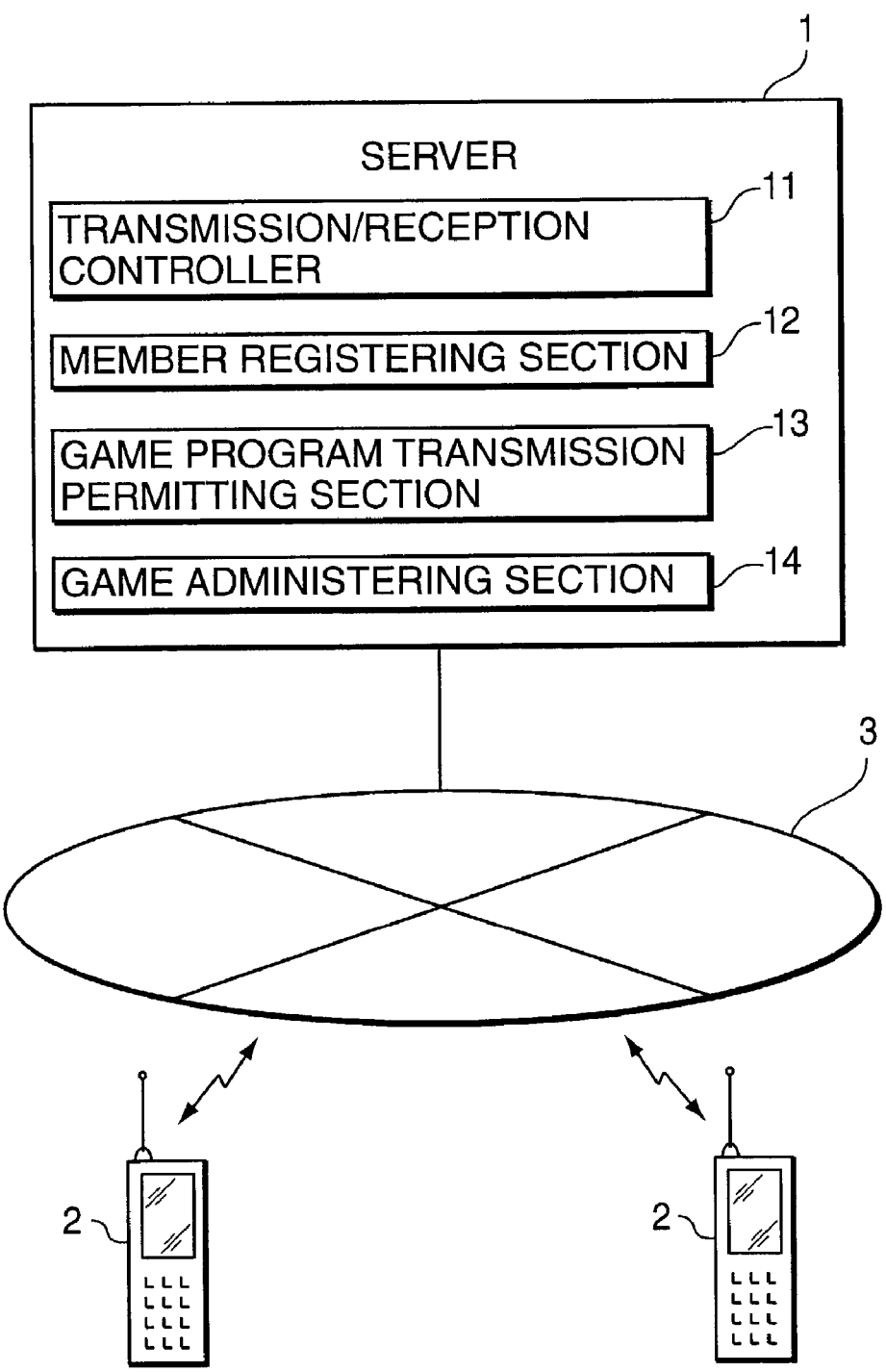
FIG. 1 is a block diagram showing the construction of a network game system using a server according to one embodiment of the invention.

Hereinafter, a network game system using a game device such as a mobile phone according to one embodiment of the present invention is described with reference to FIGS. 1 to 8. FIG. 1 is a block diagram showing the construction of a network game system using a server according to one embodiment of the invention.

In the following description, a baseball game in which a self character operated by a player (game player) as a user and an opponent character whose motions are controlled by a CPU (central processing unit) of a mobile phone compete in accordance with the rules conforming to actual baseball games is described as an example of the game played using the mobile phone. However, the present invention is similarly applicable to a tennis game or other games.

The network game system shown in FIG. 1 is provided with a server 1 and a plurality of mobile phones 2. The server 1 and the mobile phones 2 are connected with each other via a network 3 so as to enable communication therebetween. The respective mobile phones 2 function as game devices used by game players to play the baseball game. The baseball game is played using the server 1 to administer the baseball game the game players play using the mobile phones 2.

For example, Internet is used as the network 3. Normally, the mobile phones 2 and the network 3 are connected via network centers of mobile communication companies with which the respective game players have a contract. The network center and the mobile phone 2 are connected, for example, by packet communications network. In order to facilitate the description, the network centers and the like are neither shown nor described.

Next, the functions of the server 1 are described. The server 1 is a so-called WWW (World Wide Web) server, and mainly performs the delivery of a game program and administration of ranking of the game results of the respective game players. The server 1 functions as a transmission/reception controller 11 for controlling the transmission and reception of data, a member registering section 12 for receiving member registration requests from the game players, a game program transmission permitting section 13 for transmitting the game program upon receiving a game program delivery request from the mobile phone 2, and a game administering device 14 for administering the received game result data and the like by implementing a specified program in a CPU (not shown) provided inside.

The transmission/reception controller 11 transmits various input guide screens, various image data and a game progress control program to the mobile phones 2 and receives the game result data transmitted from the mobile phones 2.

The member registering section 12 stores an information such as member IDs for specifying the mobile phones 2 of the game players and carries out a member registration. The member registering section 12 also charges the game players registered as members for a monthly rate together with the mobile phone fee.

Upon receiving the game program delivery request from the mobile phone 2 of the game player, the game program transmission permitting section 13 judges whether or not this mobile phone 2 is already registered as a member, and permits the already registered game player to download the game progress control program and transmits the game progress control program to the mobile phone 2 via the transmission/reception controller 11. The section 13 transmits an image urging the member registration to the game player not registered as a member.

The mobile phones 2 store the game program in a nonvolatile memory such as a flash memory capable of retaining the program and data even if power is switched off in the case of downloading the game program from the server 1.

Although the game progress control program of the baseball game in this embodiment is delivered to the mobile phones 2 of the game players who are members, the present invention is not limited to this embodiment. For example, the game progress control program may be stored in the mobile phones 2.

The game administering device 14 administers the game data such as the game result data received from the mobile phones 2 via the network 3. Specifically, the game result data transmitted from the mobile phones 2 include, for example, items such as a winning point, batting averages, a pitcher's earned run average, the number of homeruns and the number of games. The game administering device 14 generates ranking by ranking the game results concerning the respective items, saves a ranking data of, e.g. top 30 in a specified storage (not shown) in the server 1 and makes this ranking data readable by the mobile phones 2.

Figure 2:
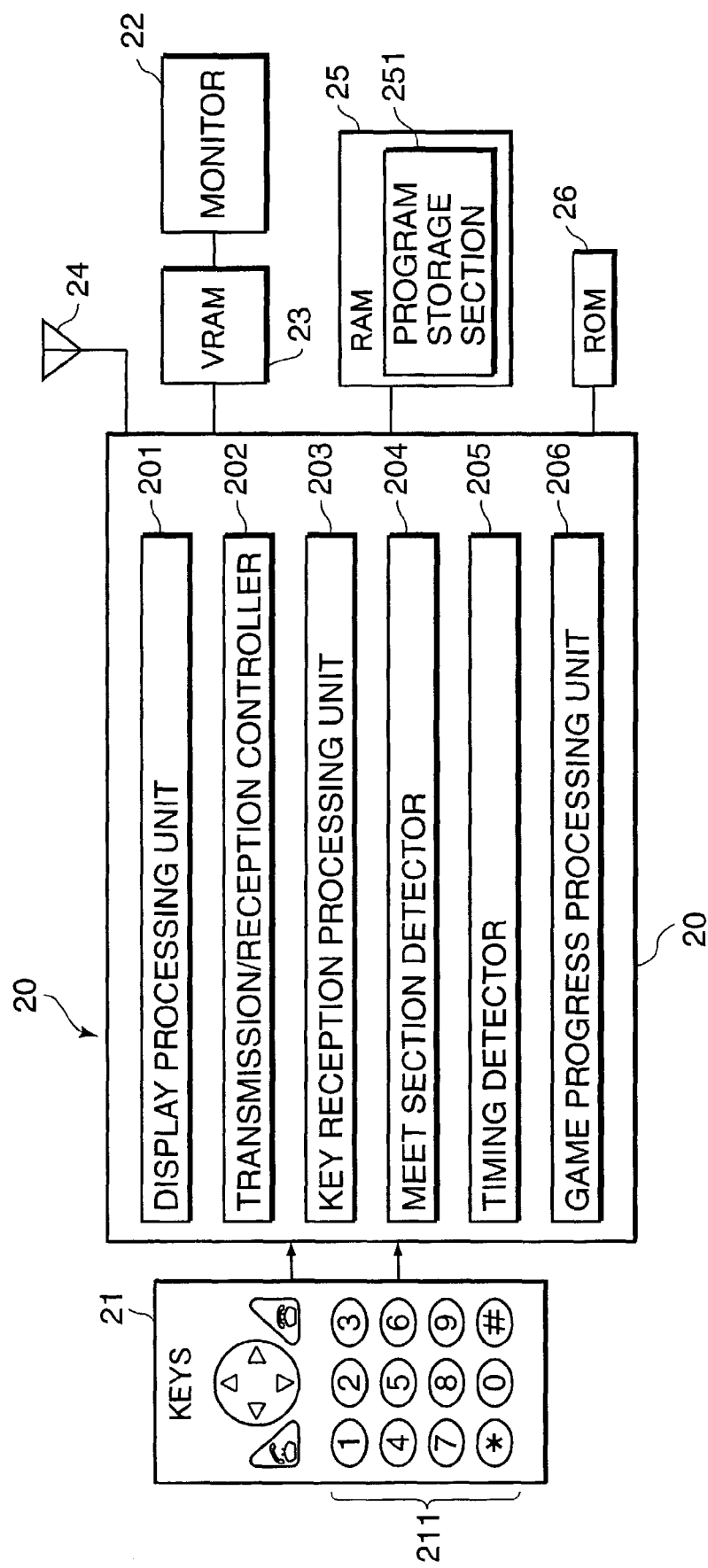
FIG. 2 is a block diagram showing main functions of a mobile phone.

FIG. 2 is a block diagram showing main functions of the mobile phone 2. In FIG. 2, only the functions essential to the present inventions are described in order to facilitate the description. The mobile phone 2 is provided with a controller 20 formed of a CPU, which controller is connected with keys 21 as an operable portion, a VRAM (video random access memory) 23 for storing an image data to be displayed on a monitor 22, an antenna 24, a RAM (random access memory) 25 for temporarily saving input data and data processed in the controller 20, and a ROM (read only memory) 26 for storing a basic program and the like for operating the mobile phone 2.

The keys 21 include a tenkey 211 including number keys of 0 to 9 used to input telephone numbers, various functions keys and a power key. The game player can operate a batter character displayed on the monitor 22 by pressing these keys down singly or in combination.

The VRAM 23 temporarily saves a frame image to be displayed on the monitor 22 formed of a liquid crystal display. The frame image written in the VRAM 23 is repeatedly read and transferred to the monitor 22 in a specified frame cycle to be displayed on the monitor 22, whereby a still image or a moving image is displayed on the monitor 22.

The RAM 25 includes a program storage section 251 for storing the game progress control program downloaded from the server 1. In this embodiment, if the game progress control program is already stored in the mobile phone 2, it is not necessary to download the game progress control program. The ROM 26 contains a program storage section for storing the game progress control program in addition to the basic program for operating the mobile phone 2.

The controller 20 functions as a display processing unit 201, a transmission/reception controller 202, a key reception processing unit 203, a meet section detector 204, a timing detector 205 and a game progress processing unit 206 by reading the game progress control program stored in the program storage section 251 and implementing it.

The display processing unit 201 displays contents of input operation for confirmation, various input guide screens and various game screens, and image data transmitted from the server 1.

The transmission/reception controller 202 receives data from a usual wireless public circuit, controls a transmission circuit, transmits and receives sound data, transmits and receives data used via the network 3. The data are transmitted and received via the antenna 24.

The key reception processing unit 203 receives a selection (designation) of one key-designated area from a key-designated area group 404 shown in FIG. 4 to be described later. The game player decides a position to hit a ball object 402 (see FIG. 4) by pressing down the number key of 1 to 9 of the tenkey 211.

The meet section detector 204 detects which one of meet sections 500a to 500e shown in FIG. 5 to be described later a center position of the ball object 402 displayed to move on a display screen has passed.

The timing detector 205 detects frame by frame a timing at which the key-designated area 404 was received by the key reception processing unit 203. In other words, a timing at which the game player pressed the key of the tenkey 211 down is detected.

The game progress processing unit 206 causes the game to progress in accordance with a batting result obtained by combining a batting result corresponded beforehand to the meet section detected by the meet section detector 204 and a batting result corresponded beforehand to the timing detected by the timing detector 205.

In this embodiment, the monitor 22 corresponds to the display portion; the keys 21 correspond to the operable portion; the key reception processing unit 203 corresponds to a designated area receiving means; the meet section detector 204 corresponds to a section detecting means; the timing detector 205 corresponds to a timing detecting means; and the game progress processing unit 206 corresponds to a game progress controlling means; the key-designated area corresponds to a designated area; and the meet section corresponds to a section.

Figure 3:
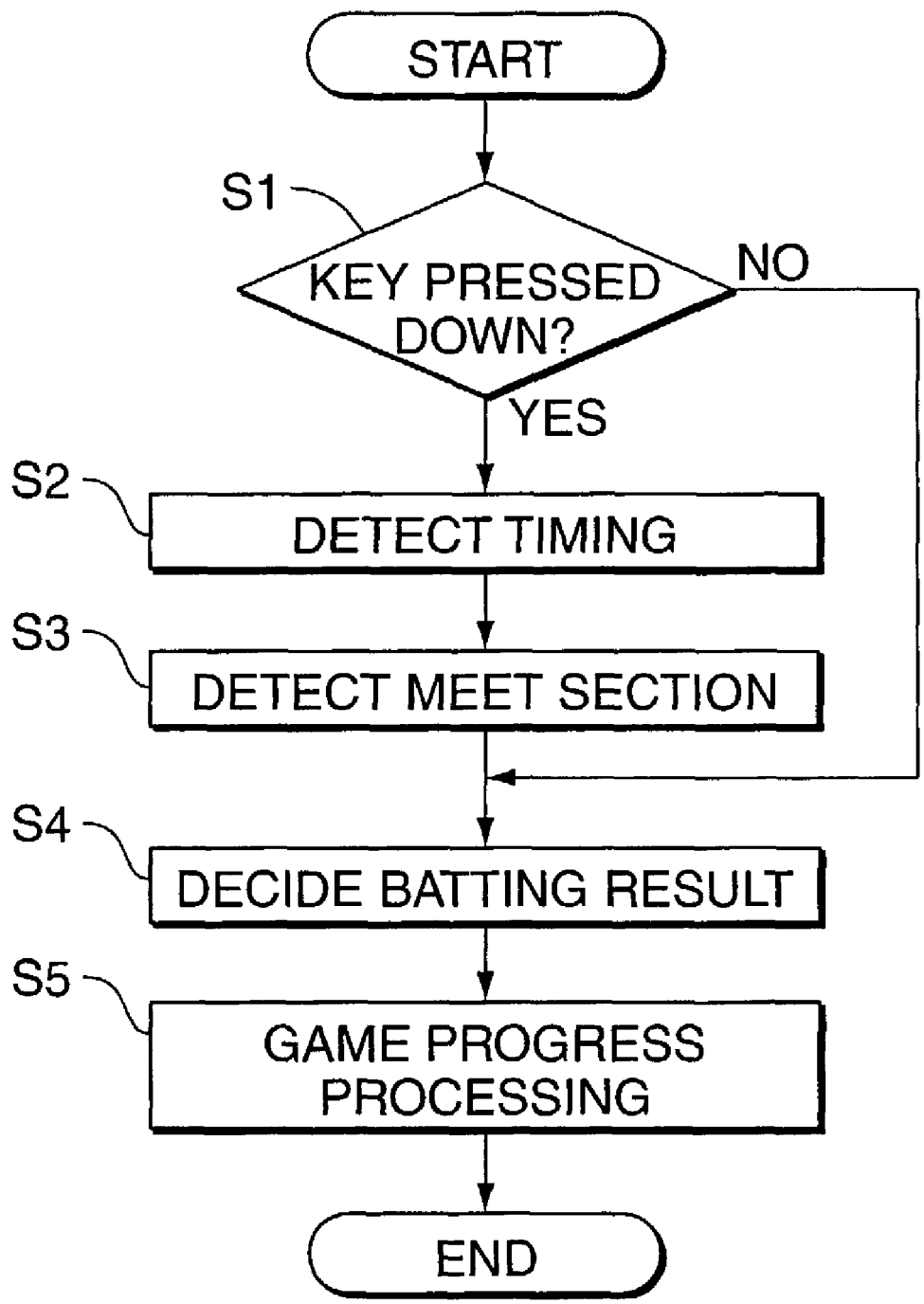
FIG. 3 is a flow chart showing an example of a game progress control by the mobile phone shown in FIG. 2.

FIG. 3 is a flow chart showing an example of the game progress control by the mobile phone 2 shown in FIG. 2. The game progress control shown in FIG. 3 is executed by the controller 20 reading the game progress control program stored in the program storage section 251 and implementing it.

First, in Step S1, the controller 20 judges whether the game player has pressed the key of the tenkey 211 down when the ball object 402 is thrown. Step S2 follows if the key of the tenkey 211 has been pressed down and the key-designated area 404 has been received, whereas Step S4 follows if no key of the tenkey 211 has been pressed down.

Figure 4:
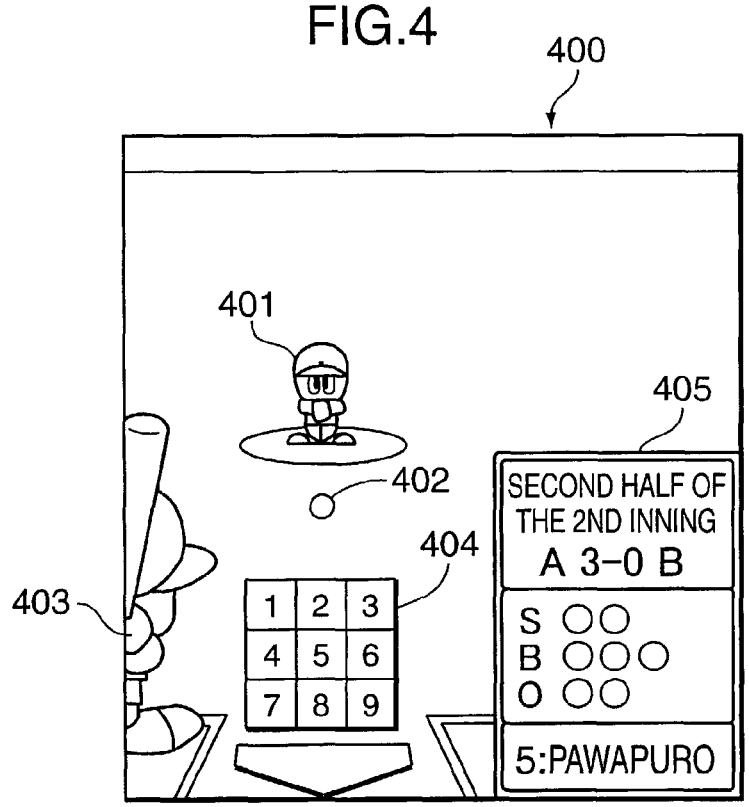
FIG. 4 is a diagram showing an example of a game screen to be displayed on a monitor in the case that a game player is in the team at bat in a baseball game.

FIG. 4 shows an example of a game screen to be displayed on the monitor 22 when the game player is controlling a batter on the team at bat in a baseball game. When the game player is controlling the batter on the team at bat, a game screen 400 is displayed. On the game screen 400 are displayed a pitcher character (opponent character) 401 whose motions are controlled by the game progress processing unit 206, the ball object 402 representing a ball thrown by the pitcher character 401, a batter character (self character) 403 operated by the game player, the key-designated areas 404 representing positions where the batter character 403 can meet (hit) the ball object 402, and a game information display frame 405 for displaying various pieces of game information such as a present score, a present pitching count and the name of the batter character.

The game player hits the ball object 402 displayed to move on the display screen by operating the batter character 403 by means of the keys 21 to obtain a specified batting result. Although the batter character 403 is described as a right-handed batter in the following description, the present invention is not particularly limited thereto and is also suitably applicable to the case where the batter character 403 is a left-handed batter.

Figure 5:
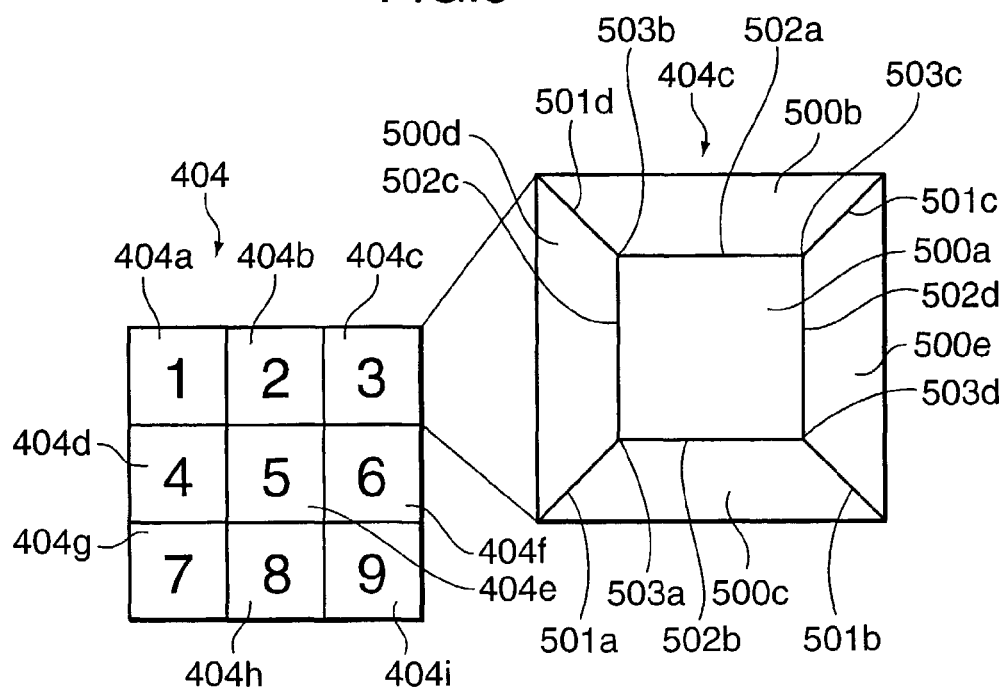
FIG. 5 is a diagram showing a key designation area group shown in FIG. 4.

FIG. 5 is a diagram showing the key-designated area group 404 shown in FIG. 4. As shown in FIG. 5, the key-designated area group 404 is divided into nine rectangular key-designated areas 404a to 404i, and numbers of 1 to 9 displayed on the key-designated areas 404a to 404i correspond to the number keys of 1 to 9 provided in the tenkey 211 of the keys 21. In other words, "3" displayed on the key-designated area 404c correspond to the number key "3" of the tenkey 211. The key reception processing unit 203 receives the designation of the key-designated area 404a to 404i when any one of the number keys of 1 to 9 of the tenkey 211 is pressed down by the game player.

Each of the key-designated areas 404a to 404i is further comprised of a plurality of meet sections. For example, the key-designated area 404c is comprised of meet sections 500a to 500e as shown in FIG. 5. The meet section 500a is a small rectangular area which serves as a first sub section included in the key-designated area 404c, and the meet sections 500b to 500e are trapezoidal areas which serve as second sub sections formed by connecting the respective vertices of the key-designated area 404c and the respective vertices of the meet section 500a neighboring the former vertices. The key-designated areas other then the key-designated area 404c are likewise comprised of five meet sections.

In this embodiment, the sizes of the meet sections are defined as follows. One side of the meet section 500a which is a small rectangular area is 9 pixels, and the height of the meet sections 500b to 500e which are trapezoidal areas is 4 pixels. The sizes of the meet sections are not limited to the above, and may be other suitable sizes. Further, the shapes of the meet sections are not limited to the above, either, and may be other suitable shapes. For example, a circular area may be used as the first sub section and four areas defined by dividing an area between the rectangular key-designated area and the circular area by two diagonal lines may be used as the four second sub sections.

Referring back to FIG. 3, the controller 20 detects the timing at which the designation of the key-designated area has been received. In other words, the controller 20 detects during which of frame periods 606 to 612 described later and shown in FIG. 6 the key of the tenkey 211 has been pressed down.

Figure 6:
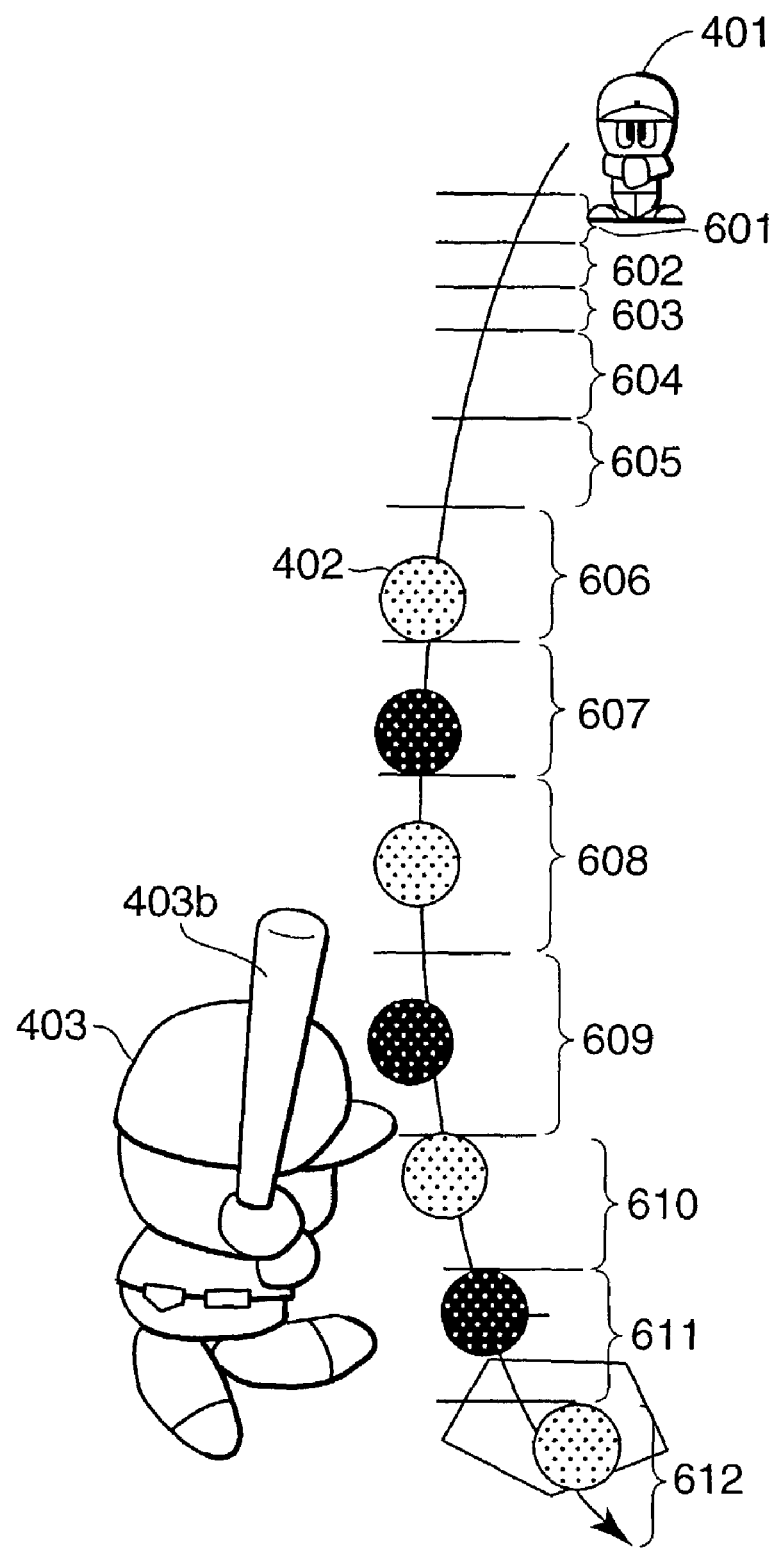
FIG. 6 is a diagram showing periods during which the same frame image is displayed.

FIG. 6 is a diagram showing the periods during the same frame image is displayed. As shown in FIG. 6, the ball object 402 thrown by the picture character 401 is so displayed as to move along a specified trajectory. The game player presses the key of the tenkey 211 down to adjust a timing of a bat object 403b to hit the ball object 402 by operating the batter character 403. Since the batter character 403 shown in FIG. 6 is a right-handed batter, it is displayed in a right batter's box. The respective frame periods 601 to 612 shown in FIG. 6 represent the periods during which the same frame image is displayed. Although no input by the tenkey 211 is received during the frame periods 601 to 605 in this embodiment, the game progress processing unit 206 may process the batting result as a missed swing.

The respective frame periods 606 to 612 are corresponded to the batting results. When the key of the tenkey 211 is pressed down during the frame period 606, the game progress processing unit 206 processes the batting result as a missed swing. When the key of the tenkey 211 is pressed down during the frame period 607, the batting result is processed as a foul ball to the left. When the key of the tenkey 211 is pressed down during the frame period 608, the batting result is processed as a batted ball to the left field. When the key of the tenkey 211 is pressed down during the frame period 609, the batting result is processed as a hit on the nose. When the key of the tenkey 211 is pressed down during the frame period 610, the batting result is processed as a batted ball to the right field. When the key of the tenkey 211 is pressed down during the frame period 611, the batting result is processed as a foul ball to the right. When the key of the tenkey 211 is pressed down during the frame period 612, the batting result is processed as a missed swing.

In the case that the batter character 403 is a left-handed batter, the batting result during the frame period 607 is processed as a foul ball to the right, the one during the frame period 608 is processed as a batted ball to the right field, the one during the frame period 610 is processed as a batted ball to the left field, and the one during the frame period 611 is processed as a foul ball to the left.

In this embodiment, the timing detector 205 detects the key pressed-down timing every period during which the same frame image is displayed. The present invention is not particularly limited thereto. The periods during which the same frame image is displayed may be more finely divided and the game may progress according to the batting results corresponding to the finely divided periods.

Referring back to FIG. 3, the controller 20 detects the meet section where the ball object 402 passes in Step S3. In other words, the controller 20 detects which of the meet sections 500a to 500e shown in FIG. 4 the center position of the ball object 402 has passed.

Specifically, in the case that the center position of the ball object 402 passes the meet section 500a shown in FIG. 5, the game progress processing unit 206 processes the batting result as a hit on the nose. In the case that the center position of the ball object 402 passes the meet section 500b, the batting result is processed as a fly ball. In the case that the center position of the ball object 402 passes the meet section 500c, the batting result is processed as a ground ball which is so displayed as to roll on the ground. In the case that the center position of the ball object 402 passes the meet section 500d, the batting result is processed as a batted ball to the left. In the case that the center position of the ball object 402 passes the meet section 500e, the batting result is processed as a batted ball to the right.

Here, the hit on the nose means a batted ball to the front. For example, it means that the ball object 402 is precisely struck by the center of the bat object 403b to fly to the front. The fly ball means a batted ball flying upward. For example, it means that the ball object 402 is struck against an upper part of the bat object 403b displaced from its center to fly upward. The ground ball means a ball batted downward. For example, it means that the ball object 402 is struck against a lower part of the bat object 403b displaced from its center to roll over the ground.

Alternatively, the flying directions of the ball object 402 may be divided into three areas, e.g. a fair area is divided into three areas while directions in a middle area are defined as center directions, those in a left area as left directions and those in a right area as right directions. In such a case, the above directions to the front, up and down are included in the center directions; the batted ball to the left means a batted ball flying in the left area; the batted ball to the right means a batted ball flying in the right area; and the batted balls to the left and the right may include balls batted to fly or to roll on the ground.

Further, if the center position of the ball object 402 passes, for example, a boundary 501a between the meet sections 500c and 500d, the game progress processing unit 206 combines the two batting results and processes as a ground ball to the left in this embodiment. Similarly, if the center position of the ball object 402 passes a boundary 501b between the meet sections 500c and 500e, the batting result is processes as a ground ball to the right. If the center position of the ball object 402 passes a boundary 501c between the meet sections 500b and 500e, the batting result is processes as a fly ball to the right. If the center position of the ball object 402 passes a boundary 501d between the meet sections 500b and 500d, the batting result is processed as a fly ball to the left.

Further, if the center position of the ball object 402 passes a boundary 502a between the meet sections 500a and 500b, the game progress processing unit 206 processes the batting result as a fly ball, which is the batting result of the meet section 500b. Similarly, if the center position of the ball object 402 passes a boundary 502b between the meet sections 500a and 500c, a boundary 502c between the meet sections 500a and 500d, a boundary 502d between the meet sections 500a and 500e, the respective batting results are processes as those corresponding to the meet sections 500c, 500d and 500e.

Further, if the center position of the ball object 402 passes a boundary point 503a between the meet sections 500a, 500c and 500d, the game progress processing unit 206 processes the batting result as the one obtained by combining the batting results corresponding to the meet sections 500c and 500d. Similarly, if the center position of the ball object 402 passes a boundary point 503b between the meet sections 500a, 500b and 500d, a boundary point 503c between the meet sections 500a, 500b and 500e, or a boundary point 503d between the meet sections 500a, 500c and 500e, the respective batting results are processes as the one obtained by combining the batting results corresponding to the meet sections 500b and 500d, the one obtained by combining the batting results corresponding to the meet sections 500b and 500e or the one obtained by combining the batting results corresponding to the meet sections 500c and 500e.

In this way, if the center position of the ball object 402 passes the boundary 501a of the meet sections 500c and 500d abutting against each other, the game is proceeded based on the batting result obtained by combining the batting results corresponding to the meet sections 500c and 500d. Thus, more diverse game progress results can be obtained.

Further, if the center position of the ball object 402 passes beyond the key-designated area received by the key reception processing unit 203, the game progress processing unit 206 processes the batting result as a missed swing.

In the case that the batter character 403 is a left-handed batter, the batting results when the center position of the ball object 402 passes the meet sections 500d, 500e are reversed.

In this way, each of the key-designated areas 404a to 404i are divided into five meet sections 500a to 500e and the batting directions and the like change depending on which of the meet sections 500a to 500e the center of the ball object 402 passes. Thus, such batting results as to change the batting direction depending on the ball-hitting position on the bat as in the actual baseball can be obtained, with the result that a baseball game approximate to the actual baseball can be represented.

Referring back to FIG. 3, the controller 20 decides the batting result in Step S4. Specifically, the batting result obtained by combining the batting result corresponding to the timing detected in Step S2 and the one corresponding to the meet section detected in Step S3 is decided. If no key is pressed down in Step S1, it is judged that the ball object 402 was watched to go by, and a strike is judged if the center position of the ball object 402 is within the key-designated area group 404 while a ball is judged if it is outside the key-designated area group 404.

Specifically, the batting result is decided as follows. Specified points set beforehand are given for the batting result corresponding to the timing detected by the timing detector 205, and specified points set beforehand are given for the batting result corresponding to the meet section detected by the meet section detector 204, and these points are added to calculate the total of points. A batting result corresponding to the total of points is processed as the batting result of the batter character 403.

For example, 6 points are given if the frame period 607 (foul ball to the left) is detected by the timing detector 205; 3 points are given if the frame period 608 (batted ball to the same field); 0 point is given if the frame period 609 (batted ball on the nose) is detected; −3 points are given if the frame period 610 (hit to the opposite field) is detected; and −6 points are given if the frame period 611 (foul ball to the right) is detected.

If the meet section detector 204 detects that the center position of the ball object 402 passes the meet section 500d, or the boundary 502c between the meet sections 500a and 500d, or the boundary 501d between the meet sections 500b and 500d, or the boundary 501a between the meet section 500c and 500d, 3 points are added. If the center position of the ball object 402 is judged to pass the meet section 500e, or the boundary 502d between the meet sections 500a and 500e, or the boundary 501c between the meet sections 500b and 500e, or the boundary 501b between the meet section 500c and 500e, −3 points are added. This total of the points becomes the batting result of the batter character 403.

Figure 7:
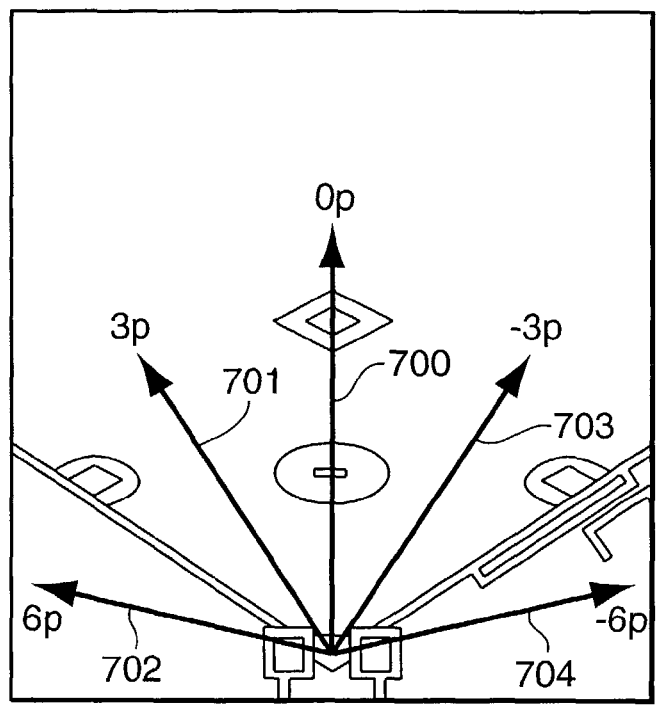
FIG. 7 is a diagram showing examples of moving directions of a ball object corresponding to the number of points.

FIG. 7 is a diagram showing exemplary moving directions of the ball object 402 corresponding to the numbers of the points. In the following cases, the total of the points is 0 and the ball object 402 is displayed to move in a direction of an arrow 700: 1) in the case that the timing detector 206 detects that the key of the tenkey 211 was pressed down during the frame period 608 and the meet section detector 204 detects that the center position of the ball object 402 passes the meet section 500e, or the boundary 502d between the meet sections 500a and 500e, or the boundary 501c between the meet sections 500b and 500e, or the boundary 501b between the meet section 500c and 500e; 2) in the case that the frame period 609 is detected and the center position of the ball object 402 is judged to pass the meet section 500a, 500b or 500c; and 3) in the case that the frame period 610 is detected and the center position of the ball object 402 is judged to pass the meet section 500d, or the boundary 502c between the meet sections 500a and 500d, or the boundary 501d between the meet sections 500b and 500d, or the boundary 501a between the meet sections 500c and 500d.

Further, the total of the points is 3 points and the ball object 402 is displayed to move in a direction of an arrow 701: 1) in the case that the frame period 607 is detected and the center position of the ball object 402 is judged to pass the meet section 500e, or the boundary 502d between the meet sections 500a and 500e, or the boundary 501c between the meet sections 500b and 500e, or the boundary 501b between the meet sections 500c and 500e; 2) in the case that the frame period 608 is detected and the center position of the ball object 402 is judged to pass the meet section 500a, 500b or 500c; and 3) in the case that the frame period 609 is detected and the center position of the ball object 402 is judged to pass the meet section 500d, or the boundary 502c between the meet sections 500a and 500d, or the boundary 501d between the meet sections 500b and 500d, or the boundary 501a between the meet sections 500c and 500d.

Furthermore, the total of the points is 6 points and the ball object 402 is displayed to move in a direction of an arrow 702: 1) in the case that the frame period 607 is detected and the center position of the ball object 402 is judged to pass the meet section 500a, 500b or 500c; and 2) in the case that the frame period 608 is detected and the center position of the ball object 402 is judged to pass the meet section 500d, or the boundary 502c between the meet sections 500a and 500d, or the boundary 501d between the meet sections 500b and 500d, or the boundary 501a between the meet sections 500c and 500d.

Further, the total of the points is −3 points and the ball object 402 is displayed to move in a direction of an arrow 703: 1) in the case that the frame period 609 is detected and the center position of the ball object 402 is judged to pass the meet section 500e, or the boundary 502d between the meet sections 500a and 500e, or the boundary 501c between the meet sections 500b and 500e, or the boundary 501b between the meet sections 500c and 500e; 2) in the case that the frame period 610 is detected and the center position of the ball object 402 is judged to pass the meet section 500a, 500b or 500c; and 3) in the case that the frame period 611 is detected and the center position of the ball object 402 is judged to pass the meet section 500d, or the boundary 502c between the meet sections 500a and 500d, or the boundary 501d between the meet sections 500b and 500d, or the boundary 501a between the meet sections 500c and 500d.

Furthermore, the total of the points is −6 points and the ball object 402 is displayed to move in a direction of an arrow 704: 1) in the case that the frame period 610 is detected and the center position of the ball object 402 is judged to pass the meet section 500e, or the boundary 502d between the meet sections 500a and 500e, or the boundary 501c between the meet sections 500b and 500e, or the boundary 501b between the meet sections 500c and 500e; 2) in the case that the frame period 611 is detected and the center position of the ball object 402 is judged to pass the meet section 500a, 500b or 500c.

In this embodiment the number of points given based on the timing and the number of points added based on the meet section are not limited to the above, and other suitable numbers of points may be adopted.

Referring back to FIG. 3, in Step S5, the controller 20 performs a game progress processing corresponding to the batting result decided in Step S4.

Figure 8:
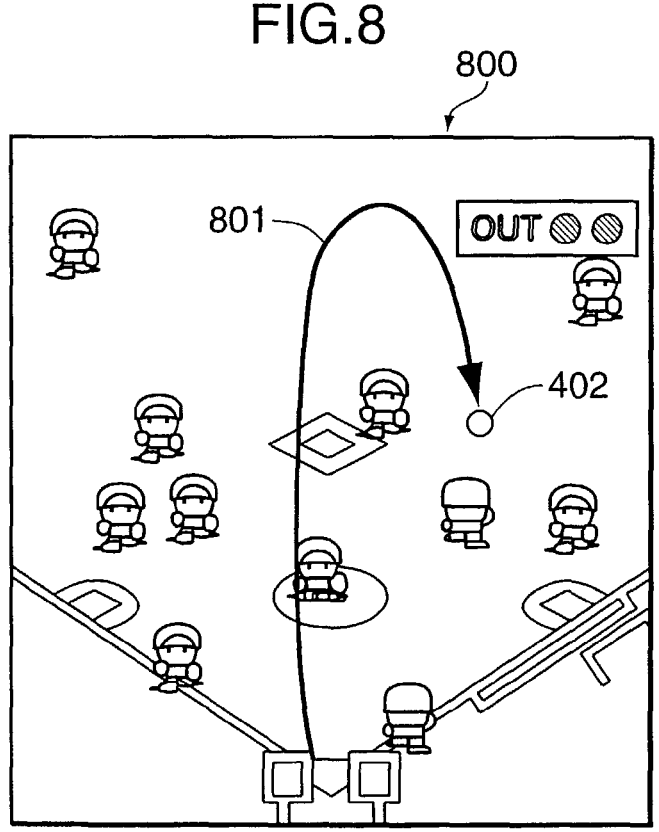
FIG. 8 is a diagram showing an example of a game screen to be displayed according to a batting result.

FIG. 8 is a diagram showing an example of a game screen to be displayed according to the batting result. The ball object 402 is displayed to move in such a trajectory as shown by an arrow 801 in a game screen 800 of FIG. 8: 1) in the case that the timing detector 205 detects the frame period 610 and the meet section detector 204 detects the passage within the meet section 500b; 2) in the case that the frame period 609 is detected and the center of the ball object 402 is judged to pass the boundary 501c between the meet sections 500b and 500e; and 3) in the case that the frame period 611 is detected and the center of the ball object 402 is judged to pass the boundary 501d between the meet sections 500b and 500d.

The above operations of Steps S1 to S5 are repeated every time the ball object 402 is thrown by the pitcher character 401, whereby the baseball game progresses.

In this way, each of a plurality of key-designated areas 404a to 40i are further divided into a plurality of meet sections 500a to 500e, and the batting results are corresponded to the respective meet sections. Thus, the game can progress in a variety of ways depending on the position of the meet section where the ball object 402 displayed to move on the display screen of the monitor 22 passes, and a variety of game progress results can be obtained by simple operations even with a game device having a simply constructed operable portion such as the mobile phone 2.

Further, the timing of receiving one key key-designated area 404 designated by means of the tenkey 211 is detected, and the game is proceeded based on the batting result obtained by combining the batting result corresponded beforehand to the detected timing and the one corresponded beforehand to the meet section 500a to 500e. Thus, the batting result can be judged based on the timing of receiving the key-designated area 404 in addition to the judgment on the batting result based on the meet section. Therefore, the batting result can be selected from a multitude of choices, making the game progress result more diverse.

Although the meet section detector 204 detects the meet section where the center position of the ball object 402 passes in the foregoing embodiment, the present invention is not particularly limited thereto. For example, the meet section where an other position of the ball object 402 passes may be detected.

Further, although the game is proceeded based on the batting result obtained by combining the batting result corresponded beforehand to the timing detected by the timing detector 205 and the one corresponded beforehand to the meet section detected by the meet section detector 204 in the foregoing embodiment, the present invention is not particularly limited thereto. For example, the game may be proceeded based only on the batting result corresponded beforehand to the meet section detected by the meet section detector 204.

Although the game device is the mobile phone in the foregoing embodiment, the present invention is not particularly limited thereto and is suitably applicable to any game device that is difficult to make complicated inputs because an operable portion thereof is formed of a tenkey or the like.

As described above, according to the present invention, the game can progress in a variety of ways depending on the section where the movable object displayed to move on the display surface of the display portion passes. Thus, a variety of game progress results can be obtained by simple operations even with such a game device whose operable portion is simply constructed like a mobile phone. Therefore, the game can be made interesting to game players.

Further, since the state of the game progress can be selected from a multitude of choices, a larger variety of game progress results can be obtained, making the game more interesting to game players.

Since the game is proceeded in accordance with the state of the game progress obtained by combining the state of the game progress corresponded beforehand to the first section and the one corresponded beforehand to the second section, an even larger variety of game progress results can be obtained, making the game even more interesting to game players.

Further, since a variety of batting results can be realized even with such a game device whose operable portion is simply constructed like a mobile phone, a baseball game can be made fully enjoyable.

Since a baseball game approximate to an actual one can be reproduced, the game can be made very interesting to game players.

In summary, the present invention relates to a recording medium storing a game progress control program for controlling the progress of a game played using a game device provided with a display portion and an operable portion, the program causing the game device to function as: designated area receiving means for receiving one designated area selected by a user by means of the operable portion from a plurality of designated areas set on a display screen of the display portion; section detecting means for detecting a section where a movable object displayed to move on the display screen of the display portion passes from a plurality of sections forming the designated area whose designation was received by the designated area receiving means; and game progress processing means for proceeding the game in accordance with a state of the game progress corresponded beforehand to the section detected by the section detecting means.

With this game progress processing program, the designation of one designated area selected by user using the operable portion of the game device from a plurality of designated areas set on the display screen of the display portion of the game device is received, the section where the movable object displayed to move on the display screen of the display portion passes is detected from a plurality of sections forming the designated area whose designation was received, and the game is proceeded in accordance with the state of the game progress corresponded beforehand to the detected section.

Since each of a plurality of designated areas is divided into a plurality of sections and the respective sections are corresponded to the states of the game progress, the game can progress in a variety of ways in accordance with the section where the movable object displayed to move on the display surface of the display portion passes.

In the aforementioned recording medium, the movable object can be displayed to move along a specified trajectory with time, the game device is caused to further function as timing detecting means for detecting the timing at which the designated area was received by the designated area receiving means, and the game progress processing means proceeds the game in accordance with a state of the game progress obtained by combining the state of the game progress corresponded beforehand to the detected timing and a state of the game progress corresponded beforehand to the detected section.

With this game progress processing program, the timing of receiving the designation of one designated area made by the operable portion of the game device is detected, and the game is proceeded based on the state of the game progress obtained by combining the state of the game progress corresponded beforehand to the detected timing and the one corresponded beforehand to the section. In other words, the state of the game progress can be judged not only based on the detected section, but also based on the timing of receiving the designated area. Thus, the state of the game progress can be selected from a multitude of choices. Therefore, a variety of game progress results can be obtained, for example, by emphasizing one state of the game progress by the other, or canceling one state of the game progress by the other, or causing both states of the game progress to simultaneously occur.

In addition, in the aforementioned recording medium, the plurality of sections may include a first section and a second section abutting against the first section, and the game progress processing means proceeds the game in accordance with a state of the game progress obtained by combining a state of the game progress corresponded beforehand to the first section and a state of the game progress corresponded beforehand to the second section if the center position of the movable object passes a boundary between the first section and the second section.

With this game progress processing program, the game is proceeded in accordance with the state of the game progress obtained by combining the state of the game progress corresponded beforehand to the first section and the one corresponded beforehand to the second section in the case that the center position of the movable object passes the boundary between the first and second sections. Therefore, a larger variety of game progress results can be obtained, for example, by emphasizing one state of the game progress by the other, or canceling one state of the game progress by the other, or causing both states of the game progress to simultaneously occur.

Furthermore, in the aforementioned recording medium, the game can be set as a baseball game, the movable object can be a ball object representing a ball used in the baseball game, and the state of the game progress is a batting result after a batter character hits the ball object in the baseball game.

With this game progress processing program, the section where the ball object displayed to move on the display surface of the display portion passes is detected and the batting result corresponded beforehand to the detected section is obtained. Thus, a variety of batting results can be realized even in such a game device whose operable portion is simply constructed like a mobile phone.

Moreover, in the recording medium, each of said designated areas may include a rectangular designated area in a shape of four-sided, each rectangular designated area includes, as the sections, a first sub section contained in the rectangular designated area and four second sub sections defined by dividing an area between the rectangular designated area and the first sub section by diagonal lines of the rectangular designated area, and the game progress processing means processes the batting result as a hit on the nose when the center position of the ball object passes the first sub section; as a fly ball when the center position of the ball passes an upper one of the four second sub sections; as a ground ball when the center position of the ball passes a lower one of the four second sub sections; and a batted ball to the left when the center position of the ball passes a left one of the four second sub sections; and as a batted ball to the right when the center position of the ball passes a right one of the four second sub sections.

With this game progress processing program, each designated area is divided into five sub sections, and the batting results conforming to actually batted baseballs are obtained based on the sub sections where the center position of the ball object passes. Thus, a baseball game approximate to an actual one can be reproduced.

The present invention may take a form of a game progress control method for controlling the progress of a game played using a game device provided with a display portion and an operable portion, said method comprising the steps of: a designated area receiving step in which the game device receives one designated area selected by a user by means of the operable portion from a plurality of designated areas set on a display screen of the display portion, a section detecting step in which the game device detects a section where a movable object displayed to move on the display screen of the display portion passes from a plurality of sections forming the designated area whose designation was received in the designated area receiving step, and a game progress processing step in which the game device proceeds the game in accordance with a state of the game progress corresponded beforehand to the section detected in the section detecting step.

With this game progress control method, the designation of one designated area selected by user using the operable portion of the game device from a plurality of designated areas set on the display screen of the display portion of the game device is received, the section where the movable object displayed to move on the display screen of the display portion passes is detected from a plurality of sections forming the designated area whose designation was received, and the game is proceeded in accordance with the state of the game progress corresponded beforehand to the detected section.

Since each of a plurality of designated areas is divided into a plurality of sections and the respective sections are corresponded to the states of the game progress, the game can progress in a variety of ways in accordance with the section where the movable object displayed to move on the display surface of the display portion passes.

In addition, the present invention also takes a form of a game device provided with a display portion and an operable portion, comprising: designated area receiving means for receiving one designated area selected by a user by means of the operable portion from a plurality of designated areas set on a display screen of the display portion, section detecting means for detecting a section where a movable object displayed to move on the display screen of the display portion passes from a plurality of sections forming the designated area whose designation was received by the designated area receiving means, and game progress processing means for proceeding the game in accordance with a state of the game progress corresponded beforehand to the section detected by the section detecting means.

With this game device, the designation of one designated area selected by user using the operable portion of the game device from a plurality of designated areas set on the display screen of the display portion of the game device is received, the section where the movable object displayed to move on the display screen of the display portion passes is detected from a plurality of sections forming the designated area whose designation was received, and the game is proceeded in accordance with the state of the game progress corresponded beforehand to the detected section.

Since each of a plurality of designated areas is divided into a plurality of sections and the respective sections are corresponded to the states of the game progress, the game can progress in a variety of ways in accordance with the section where the movable object displayed to move on the display surface of the display portion passes.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

This application is based on Japanese patent application serial no. 2001-230294, filed in Japan Patent Office on Jul. 30, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A non-transitory computer-readable medium storing a game control program in executable form for controlling a game device provided with a display portion and an operable portion with a set of keys operable by a user to provide input to play a game on the game device, the game including first and second opposite sides, the program controlling the game device to function as an apparatus comprising:
   a moving object direction device, operated by said second opposing side, configured for directing a moving object depicted on said display screen;
   a designating device configured for designating a plurality of areas concurrently corresponding to different predefined locations on a display screen of the display portion, each of said designated areas having a corresponding key among said set of keys of the operable portion associated therewith and being selectable by selection of a corresponding one of said set of keys of the operable portion by said first opposing side in anticipation of said moving object engaging a selected one of said designated areas, and each of said designated areas including a plurality of sections defined wholly within and based on an outer perimeter boundary of the designated area and said sections being in fixed spatial relationship with respect to the outer perimeter boundary of the designated area independent of operation of said keys throughout a selection process selecting the designated area to effect operation of the designated area;

said moving object direction device directing said moving object depicted on said display screen to move to one of said plurality of designated areas so as to engage with said one of said plurality of designated areas in accordance with operations by said second opposing side;

a designated area selection receiving device configured for receiving a selection input from the operable portion initiated by the user selecting one of the set keys of the operable portion for the first opposing side and effecting, based on said selection input, selection of a single entire one of said plurality of designated areas to be a selected designated area for attempted engagement with said moving object operated by said second opposing side, said selection of said selected designated area including a concurrent selection of each of said plurality of sections of said selected designated area for processing initiating engagement with said moving object operated by said second opposing side whereby said selection process is effected;

a section detecting device configured for detecting a section, engaged by the moving object, of said sections of said selected designated area when the moving object engages said selected designated area; and a game processing device configured for processing execution of the game, in accordance with a game result predetermined as assigned to the section detected by the section detecting device, to display on the display portion the game result assigned to the section detected whereby said operation of said selected designated area is effected.

2. The recording medium according to claim 1, wherein the moving object is displayed to move along a specified trajectory with time, the game device is caused to further function as a timing detecting device configured for detecting a timing difference amount between which the selected designated area was received by the designated area selection receiving device and arrival of said moving object at said plurality of designated areas, and the game processing device processes execution of the game in accordance with a game result obtained by combining the game result predetermined as assigned to the detected timing difference amount and a game result predetermined as assigned to the detected section.

3. The recording medium according to claim 1, wherein:
the plurality of sections include a first section and a second section abutting against the first section and defining a boundary where said second section abuts said first section;

said first section having a first game result assigned to said first section, said second section having a second game result assigned to said second section, said first game result being different from said second game result; and the game processing device processes execution of the game in accordance with a game result obtained by combining the first game result with the second game result if a center position of the moving object passes through the boundary where the first section and the second section abut.

4. The recording medium according to claim 1, wherein the game is a baseball game, the moving object is a ball object representing a ball used in the baseball game, and the game result is a batting result after a batter character hits the ball object in the baseball game.

5. The recording medium according to claim 4, wherein:
each of said designated areas includes a rectangular designated area, each of said rectangular designated areas includes, as the sections, a first sub section contained in the rectangular designated area and four second sub sections defined by dividing an area between the outer perimeter boundary of the rectangular designated area and the first sub section by diagonal lines of the rectangular designated area, and the game processing device processes the batting result as a:
hit on the nose when a center position of the ball object passes through the first sub section;
a fly ball when the center position of the ball passes through an upper one of the four second sub sections;
a ground ball when the center position of the ball passes through a lower one of the four second sub sections;
a batted ball to the left when the center position of the ball passes through a left one of the four second sub sections; and
a batted ball to the right when the center position of the ball passes through a right one of the four second sub sections.

6. A game execution method for controlling a game device provided with a display portion and an operable portion with a set of keys operable by a user to provide input in playing of a game, the game including first and second opposing sides, the method comprising:

moving an object on a display screen of said display portion based on operations of said second opposing side;

providing concurrently a plurality of different predefined designated areas set on a display screen of the display portion, each of said designated areas having a corresponding one of said set of keys of the operable portion associated therewith and being selectable by selection of a corresponding one of said set of keys of the operable portion by said first opposing side in anticipation of said moving object engaging a selected one of said designated areas, and each of said designated areas including a plurality of sections defined wholly within and based on an outer perimeter boundary of the designated area and said sections being in fixed spatial relationship with respect to the outer perimeter boundary of the designated area independent of operation of said keys throughout a selection process selecting the designated area to effect operation of the designated area;

directing said moving object depicted on said display screen to move to one of said plurality of designated areas so as to engage with said one of said plurality of designated areas in accordance with operations by said second opposing side;

receiving a selection input from the operable portion initiated by said user selecting one of the set keys of the operable portion for the first opposing side and effecting, based on said selection input, selection of a single entire one of said plurality of designated areas to be a selected designated area for attempted engagement with said moving object directed by operations of said second opposing side, said selection of said selected designated area including a concurrent selection of each of said plurality of sections of said selected designated area whereby said selection process is effected;

a section detecting step for detecting a section engaged by the moving object of said sections of said selected designated area when the moving object engages said selected designated area; and displaying on the display a game result predetermined as assigned to the section detected in the section detecting step whereby operation of said selected designated area is effected.

7. A game device provided with a display portion and an operable portion with a set of keys operable by a user to provide input to play a game having first and second opposing sides, the game device comprising:
a moving object direction device, operated by said second opposing side, configured for directing a moving object depicted on said display screen;
a plurality of designated areas concurrently corresponding to different predefined locations set on a display screen of the display portion, each of said designated areas having a corresponding one of said set of keys of the operable associated therewith and being selectable by selection of a corresponding one of said set of keys of the operable portion by said first opposing side in anticipation of said moving object engaging a selected one of said designated areas, and each of said designated areas including a plurality of sections defined wholly within and based on an outer perimeter boundary of the designated area and said sections being in fixed spatial relationship with respect to the outer perimeter boundary of the designated area independent of operation of said keys throughout a selection process selecting the designated area to effect operation of the designated area;
said moving object direction device directing said moving object depicted on said display screen to move to one of said plurality of designated areas so as to engage with said one of said plurality of designated areas in accordance with operations by said second opposing side;
a designated area selection receiving device configured for receiving a selection input from the operable portion initiated by the user selecting one of the set keys of the operable portion for the first opposing side and effecting, based on said selection input, selection of a single entire one of said plurality of designated areas to be a selected designated area for attempted engagement with said moving object operated by said second opposing side, said selection of said selected designated area including a concurrent selection of each of said plurality of sections of said selected designated area whereby said selection process is effected;
a section detecting device configured for detecting a section, engaged by the moving object, of said sections of said selected designated area when the moving object engages said selected designated area; and
a game processing device configured for processing execution of the game in accordance with a game result predetermined as assigned to the section detected by the section detecting device to display on the display portion the game result predetermined as assigned to the section detected whereby operation of said selected designated area is effected.

8. The game device according to claim 7, wherein the game is a baseball game, the moving object is a ball object representing a ball used in the baseball game, and the game result is a batting result after a batter character hits the ball object in the baseball game.

9. The game device according to claim 8, wherein:
each of said designated areas includes a rectangular designated area,
each of said rectangular designated areas includes, as the sections, a first sub section contained in the rectangular designated area and four second sub sections defined by dividing an area between the rectangular designated area and the first sub section by diagonal lines of the rectangular designated area, and
the game processing device processes the batting result as a:
hit on the nose when a center position of the ball object passes through the first sub section;
a fly ball when the center position of the ball passes through an upper one of the four second sub sections;
a ground ball when the center position of the ball passes through a lower one of the four second sub sections; and
a batted ball to the left when the center position of the ball passes through a left one of the four second sub sections; and
a batted ball to the right when the center position of the ball passes through a light one of the four second sub sections.

10. The game device according, to claim 7, wherein the moving object is displayed to move along a specified trajectory with time, the game device is caused to further function as a timing detecting device configured for detecting the timing at which the selected designated area was received by the designated area selection receiving device, and the game processing device processes execution of the game in accordance with a game result obtained by combining the game result predetermined as assigned to the detected timing and a game result predetermined as assigned to the detected section.

11. The game device according to claim 7, wherein:
the plurality of sections include a first section and a second section abutting, against the first section and defining a boundary where said second section abuts said first section;
said first section having a first game result assigned to said first section to correspond thereto, said second section having a second game result assigned to said first section to correspond thereto, said first game result being different from said second game result; and
the game processing device processes execution of the game in accordance with a game result obtained by combining the first game result with the second game result if a center position of the moving object passes the boundary where the first section and the second section abut.

12. The game device of claim 7 wherein said areas of said plurality of areas concurrently correspond to differing locations on the display screen of the display portion.

13. The game device of claim 12 wherein said areas of said plurality of areas maintain positions fixed relative a reference frame in a game space of said game.

14. The game device of claim 13 wherein said reference frame is a strike zone and said game is baseball.

15. The game device according, to claim 14, wherein:
each of said designated areas includes a rectangular designated area,
each of said rectangular designated areas includes, as the sections, a first sub section contained in the rectangular designated area and four second sub sections defined by dividing an area between the rectangular designated area and the first sub section by diagonal lines of the rectangular designated area, and
the game processing device processes the batting result as a:
hit on the nose when a center position of the ball object passes through the first sub section;

a fly ball when the center position of the ball passes through an upper one of the tour second sub sections;

a ground ball when the center position of the ball passes through a lower one of the four second sub sections; and a batted ball to the left when the center position of the ball passes through a left one of the four second sub sections; and a batted ball to the right when the center position of the ball passes through a right one of the four second sub sections.

16. The recording medium of claim 1 wherein said areas of said plurality of areas concurrently correspond to differing locations on the display screen of the display portion.

17. The recording medium of claim 16 wherein said areas of said plurality of areas maintain positions fixed relative a reference frame in a game space of said game.

18. The recording medium of claim 17 wherein said reference frame is a strike zone and said game is baseball.

19. The recording medium of claim 18, wherein:
   each of said designated areas includes a rectangular designated area,
   each of said rectangular designated areas includes, as the sections, a first sub section contained in the rectangular designated area and four second sub sections defined by dividing an area between the rectangular designated area and the first sub section by diagonal lines of the rectangular designated area, and
   the game processing device processes the batting result as a:
      hit on the nose when a center position of the ball object passes through the first sub section;
      a fly ball when the center position of the ball passes through an upper one or the four second sub sections;
      a ground ball when the center position of the ball passes through a lower one of the four second sub sections; and
      a batted ball to the left when the center position of the ball passes through a left one of the four second sub sections; and
      a batted ball to the right when the center position of the ball passes through a right one of the four second sub sections.

20. The recording medium of claim 16, wherein each of said plurality of areas is adjacent to another of said plurality of areas and said plurality of sections have common borders with each other which are not shown on said display.

21. The recording medium of claim 1, wherein each of said plurality of areas is adjacent to another of said plurality of areas and said plurality of sections have common borders with each other which are not shown on said display.

22. The game device of claim 12, which each of said plurality of areas is adjacent to another of said plurality of areas and said plurality of sections have common borders with each other which arc not shown on said display.

23. The game device of claim 7, wherein each of said plurality of areas is adjacent to another of said plurality of areas and said plurality of sections have common borders with each other which are not shown on said display.

24. The recording medium of claim 1, wherein said recording medium stores the game control program in an executable form configured for controlling a game device provided with said display portion and said operable portion disposed are on one single handheld unit having said display portion and said operable portion proximately coupled to each other in said handheld unit.

25. The game device of claim 7, wherein said display portion and said operable portion are disposed on one single handheld unit having said display portion and said operable portion proximately coupled to each other in said handheld unit.

* * * * *

UNITED STATES PATENT AND TRADEMARK OFFICE
CERTIFICATE OF CORRECTION

PATENT NO.         : 7,740,532 B2
APPLICATION NO.    : 10/201426
DATED              : June 22, 2010
INVENTOR(S)        : Kazuhiro Namba et al.

It is certified that error appears in the above-identified patent and that said Letters Patent is hereby corrected as shown below:

Title Page, Item (73) Assignee,

Change the Assignee's information from:

"Konami Computer Entertainment Osaka, Inc., Ltd., Tokyo (JP)"

to

"Konami Digital Entertainment Co., Ltd., Tokyo (JP)"

Signed and Sealed this
Third Day of May, 2011

David J. Kappos
*Director of the United States Patent and Trademark Office*